United States Patent
Yamane et al.

(10) Patent No.: US 8,888,621 B2
(45) Date of Patent: Nov. 18, 2014

(54) SELF-LUBRICATING CHAIN

(75) Inventors: Kentaro Yamane, Osaka (JP); Makoto Fujiwara, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 1129 days.

(21) Appl. No.: 12/512,887

(22) Filed: Jul. 30, 2009

(65) Prior Publication Data

US 2010/0081528 A1 Apr. 1, 2010

(30) Foreign Application Priority Data

Oct. 1, 2008 (JP) ................................. 2008-256505

(51) Int. Cl.
*F16H 57/04* (2010.01)
(52) U.S. Cl.
USPC .......................................................... 474/91
(58) Field of Classification Search
USPC .......................................................... 474/91
See application file for complete search history.

(56) References Cited

U.S. PATENT DOCUMENTS

| | | | | |
|---|---|---|---|---|
| 436,008 A | * | 9/1890 | Robinson | 474/91 |
| 797,641 A | * | 8/1905 | Thompson | 474/91 |
| 1,304,933 A | * | 5/1919 | Barrows | 474/91 |
| 2,049,841 A | * | 8/1936 | Kjaer | 474/229 |
| 3,336,089 A | * | 8/1967 | Krickler | 305/118 |
| 3,762,778 A | * | 10/1973 | Boggs et al. | 305/118 |
| 3,958,836 A | * | 5/1976 | Brown et al. | 305/118 |
| 4,042,065 A | * | 8/1977 | Crum | 184/109 |
| 5,425,679 A | * | 6/1995 | Utz | 474/91 |
| 6,938,732 B2 | * | 9/2005 | Garbagnati | 184/15.1 |
| 2008/0061512 A1 | * | 3/2008 | Yamane et al. | 277/345 |

FOREIGN PATENT DOCUMENTS

JP 2007-246234 9/2007

* cited by examiner

*Primary Examiner* — Henry Liu
(74) *Attorney, Agent, or Firm* — Workman Nydegger

(57) ABSTRACT

The invention relates to a self-lubricating chain which includes a connecting pin which is used to connect inner and outer link portions. The connecting pin includes a lubricating hole and a hollow portion where a lubricating oil supply may be disposed and held in place by a lid member, which provides a press fit and tight seal so as to provide a reliable lubricating oil supply and a durable chain which has improved durability.

18 Claims, 7 Drawing Sheets

SELF-LUBRICATING CHAIN

CROSS-REFERENCE TO RELATED APPLICATIONS

The entire disclosure of Japanese Patent Application No. 2008-256505, filed Oct. 1, 2008 is expressly incorporated herein by reference.

BACKGROUND OF THE INVENTION

1. The Field of the Invention

The present invention relates to a self lubricating chain which may be used as a roller chain, a bush chain, a bushless roller chain or a chain where the roller is fitted directly onto a roller pin without using a bush. More particularly, the present invention relates to a self-lubricating chain which may be used as a bucket chain for loading iron core, coal, and the like, as a chain for conveying heavy loads, such as automobiles, and the like, or as a flow conveyor chain for conveying granules.

2. The Relevant Technology

In one self-lubricating chain currently known in the art, an outer link and inner link are connected together in a large number according to the specific requirements of the chain. The outer link includes at least two outer link plates which are connected to the inner links using front and rear connecting pin holes into which a connecting pin is fitted. The inner link includes at least two inner link plates which are connected together using front and rear bushes, which may be fit-secured bushes or loosely fitted bushes. In this chain, a lubricating hole is formed in the center of the connecting pin in the longitudinal direction. A hollow portion is formed on one side of the connecting pin and is used for attaching a lubricating oil supply device to the hollow portion so that lubricating oil is supplied from the lubricating hole to the outer circumferential of the connecting pin.

An example of one such connecting pin 510 currently known in the art is shown in FIG. 7. The connecting pin 510 includes a lubricating hole 511 formed at the substantially central portion in a longitudinal direction of the connecting pin which opens at an outer circumferential surface 510a, so that a lubricating oil can be supplied to the outer circumferential surface 510a of a connecting pin through the lubricating hole 511.

The connecting pin 510 also includes a hollow portion 512, which extends from one side of the connecting pin 510 to an end portion 513 which is located at the center of the connecting pin in the longitudinal direction. The bottom portion 513 includes a concave fitting portion 514 having a lubricating oil inflow port 514a which communicates with the lubricating hole 511.

A lubricating oil supply device 520 is detachably mounted to the hollow portion 512. The oil supply device 520 has a length substantially equal to the length of the hollow portion 512. At a front end of the lubricating oil supply device 520 is formed a protruding portion 521 having a lubricating oil outflow port 521a. When the lubricating oil supply device 520 is attached to the hollow portion 512, the protruding portion 521 is screwed in the concave fitting portion 514 so as to be brought into close contact therewith, and the lubricating oil outflow port 521a of the protruding portion 521 and the lubricating oil inflow port 514a of the concave fitting portion 514 are connected to each other so that a lubricating oil reservoir 522 and the lubricating hole 511 communicate with each other.

An outflow mechanism, which allows a lubricating oil to gradually flow out of the lubricating oil outflow port 521a is formed at the substantially central portion in a longitudinal direction of the connecting pin, and a lubricating oil within lubricating oil reservoir 522 is supplied to the outer circumferential surface 510a of the connecting pin. This continues until the lubricating oil within the lubricating oil reservoir 522 is depleted, at which time the supply of the lubricating oil is performed by exchanging the lubricating oil supply device 520.

An example of one such chain currently known in the art is described in Japanese Patent Publication No. 2007-246234.

One problem with this configuration, however, is that the lubricating oil supply device 520 is screwed into the hollow portion 512. Thus, at the time of attaching or detaching of the lubricating oil supply device 520, it is necessary to turn the entire lubricating oil supply device 520. Unfortunately, this process is time consuming, and it is necessary to spend a large amount of time to replace the oil supply device 520.

Further, since the lubricating oil supply device 520 is loosely fitted into the hollow portion 512, a space is formed between the lubricating oil supply device 520 and the hollow portion 512, meaning that foreign matter can enter from the outside. Additionally, as the self-lubricating chain is driven, vibrations form in the space, generating noise or loosening the screw between the protruding portion 521 and the concave fitting portion 514. In some instances, these problems can lead to leaks and the deterioration of the chain.

Also, because one end of the lubricating oil supply device 520 is exposed, it is possible that the oil supply device 520 may become damaged or broken as articles are conveyed by the chain.

Accordingly, there is a need for a self-lubricating chain which solves the above-mentioned prior art problems by allowing the quick and easy replacement of the lubricating oil supply device, wherein the chain and oil supply device prevent the entry of foreign matter, reduce the vibration of the lubricating oil supply device due, reduce noise, and prevent leakage and deterioration of the chain.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF THE INVENTION

These and other limitations are overcome by embodiments of the invention which relate to a new design for an engagement chain, which has improved buckling strength and durability.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

A first embodiment of the invention is a self-lubricating chain. The chain includes an outer link including at least two outer link plates including front and rear connecting pin holes, the two outer link plates each being securely fit on ends of connecting pins disposed in the front and rear connecting pin holes, an inner link including at least two inner link plates, the two inner link plates being fit together using bushes disposed therebetween, the inner link and outer link being connected by the connecting pins connecting to the bushes, and a lubricating oil supply device having a protruding portion having a lubricating oil outflow port. The connecting pin includes a lubricating hole is formed in the center portion of the connecting pin in the longitudinal direction so as to connect the inside of the connecting pin to the outside of the connecting pin, a hollow portion formed inside the connecting pin, which has a concave fitting portion which extends from one side of the connecting pin to the central portion of the connecting pin so as to communicate with the lubricating hole. The lubricating oil supply device is attachably and detachably attached in a close fitted and press-sealed manner to concave fitting portion of the hollow portion using a lid member so that lubricating oil is supplied from said lubricating hole to the outside of the connecting pin.

One benefit of aspects of the invention is that because the hollow portion has a concave fitting portion communicating with the lubricating hole at the bottom portion, and a protruding portion of the lubricating oil supply device having a lubricating oil outflow port which is closely fitted to the concave fitting portion, with the lubricating oil supply device being press-sealed into the hollow portion using a lid member, it is possible to quickly and easily attach and detach the lubricating oil supply device without rotating the oil supply device. Thus, it is easier to attach and detach the lubricating oil supply device of the present invention. Furthermore, it is possible to prevent damage to the lubricating oil supply device because the oil supply device is not exposed to the articles conveyed by the chain and the like.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to a self-lubricating chain, which is an example of the present invention, will be described with reference to drawings below.

Figure 1:
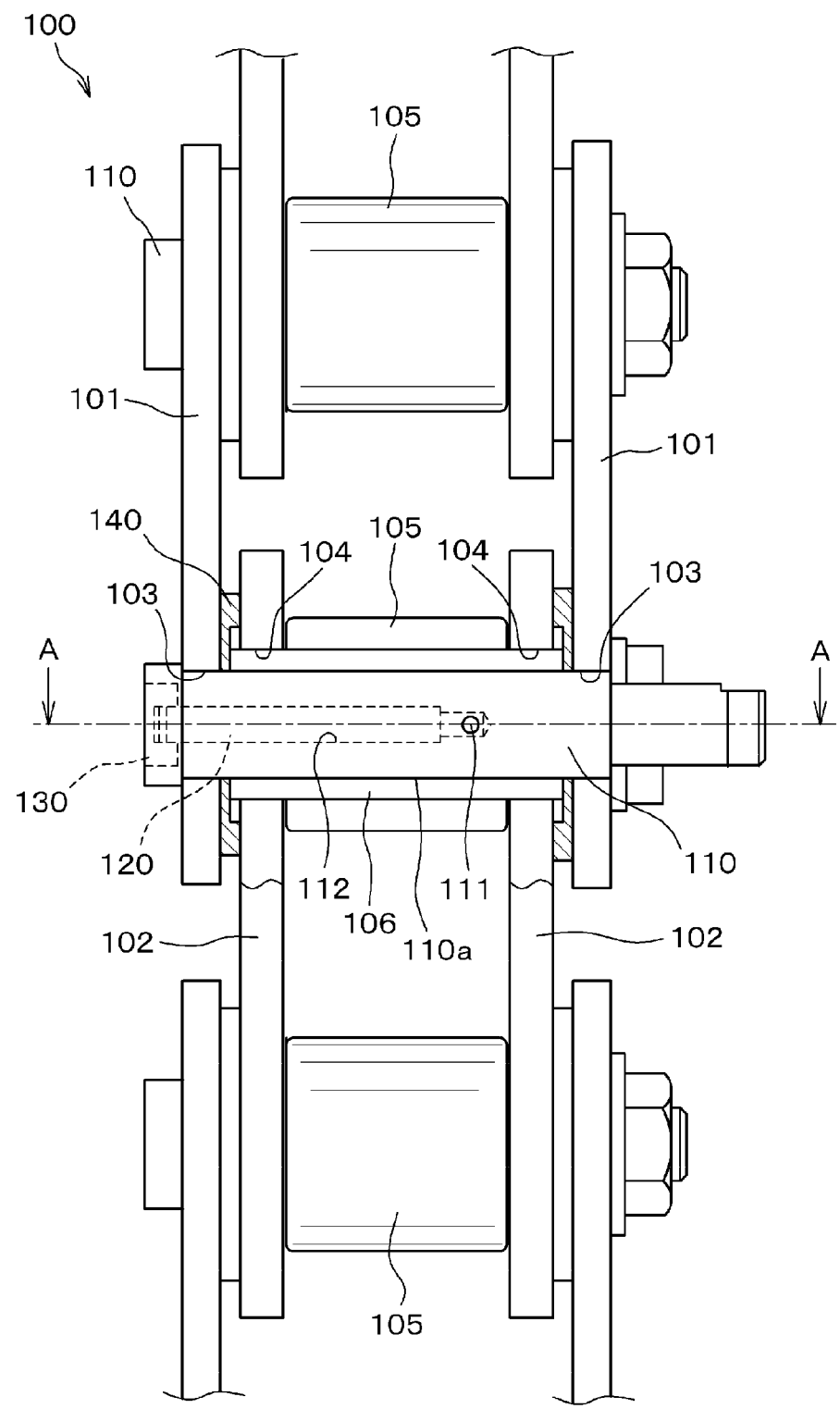
FIG. 1 is partial cross-sectional and plan view of a self-lubricating chain according to a first embodiment of the present invention.
Figure 2:
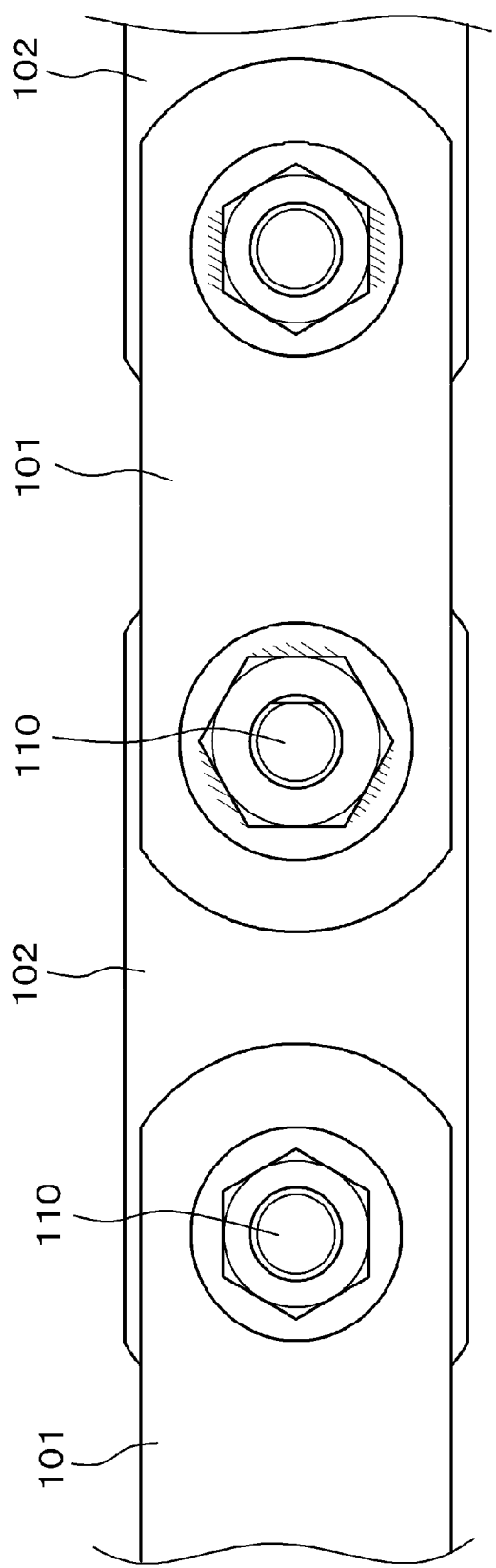
FIG. 2 is a side view of the self-lubricating chain of FIG. 1.

FIGS. 1 and 2 illustrate a self-lubricating chain 100 according to one embodiment of the invention. The chain 100 includes an outer link including outer link plates 101 each of which include front and rear connecting pin holes 103 which are fit-secured using a connecting pin 110 to an inner link. The inner link includes a pair of inner link plates 102 which include front and rear bush holes 104 which are connected by a roller 105 and loosely fitted bushes 106. The inner links and outer links are connected to each other in a large number by alternately connecting loosely fitting connecting pins 110 to the bushes 106.

Figure 3:
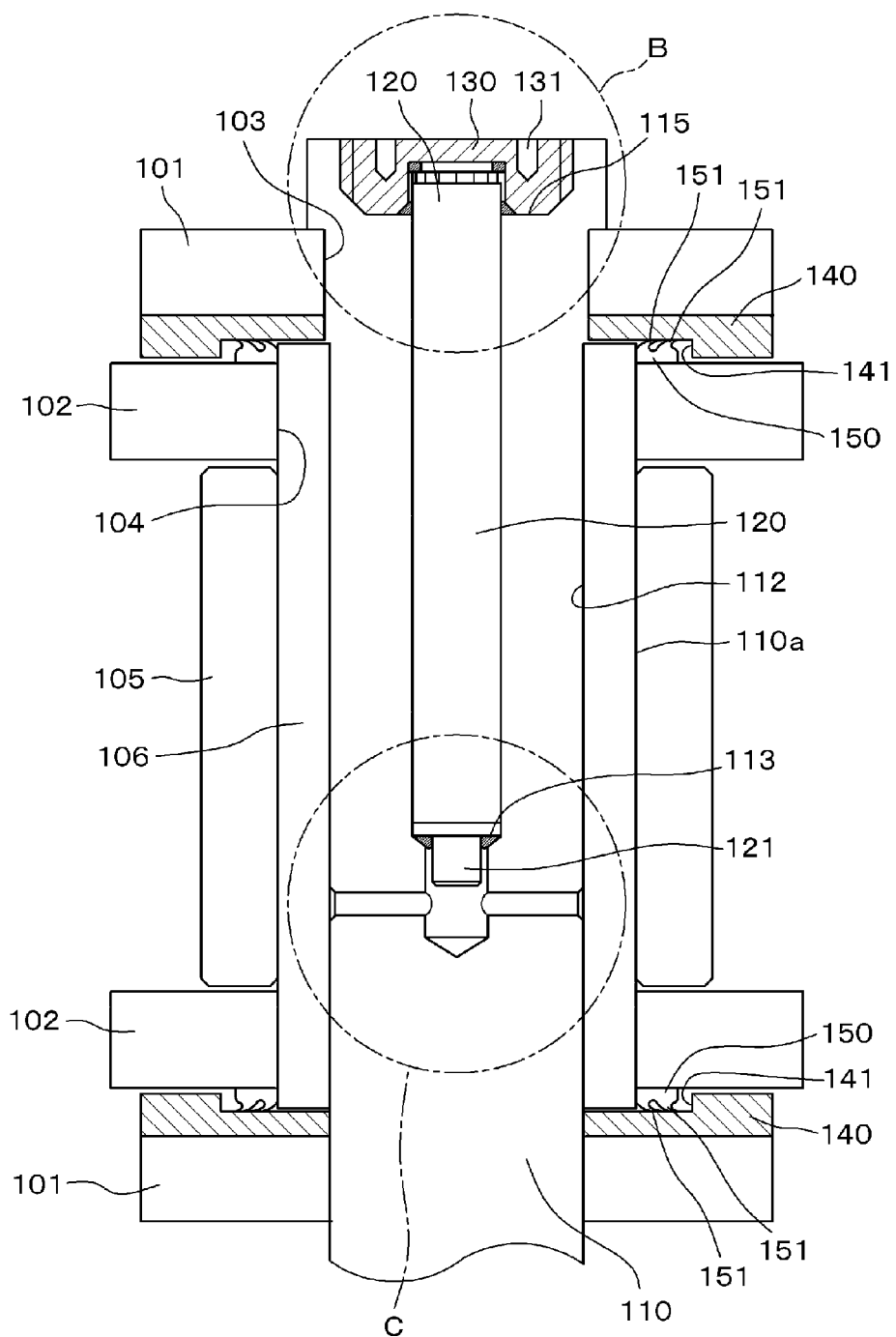
FIG. 3 is an A-A cross-sectional view of FIG. 1.
Figure 4:
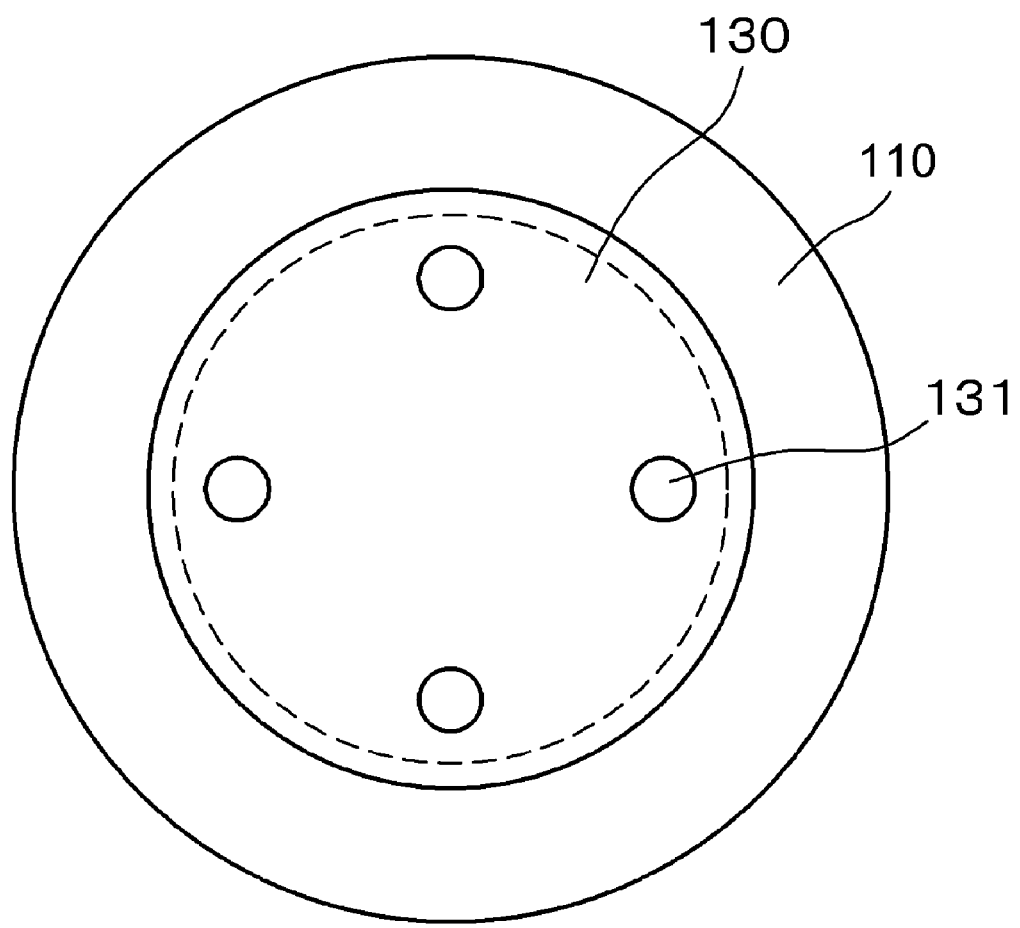
FIG. 4 is a front view of FIG. 3.
Figure 5:
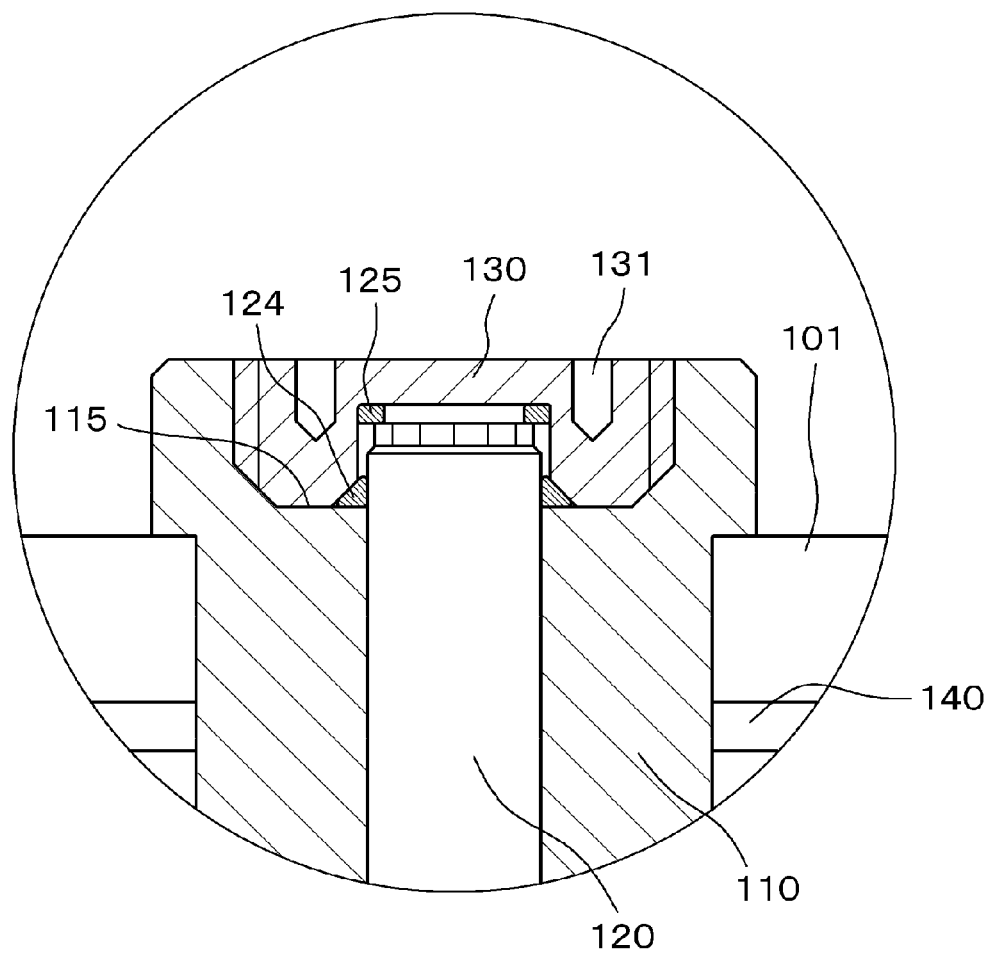
FIG. 5 is an enlarged view of portion B of FIG. 3.
Figure 6:
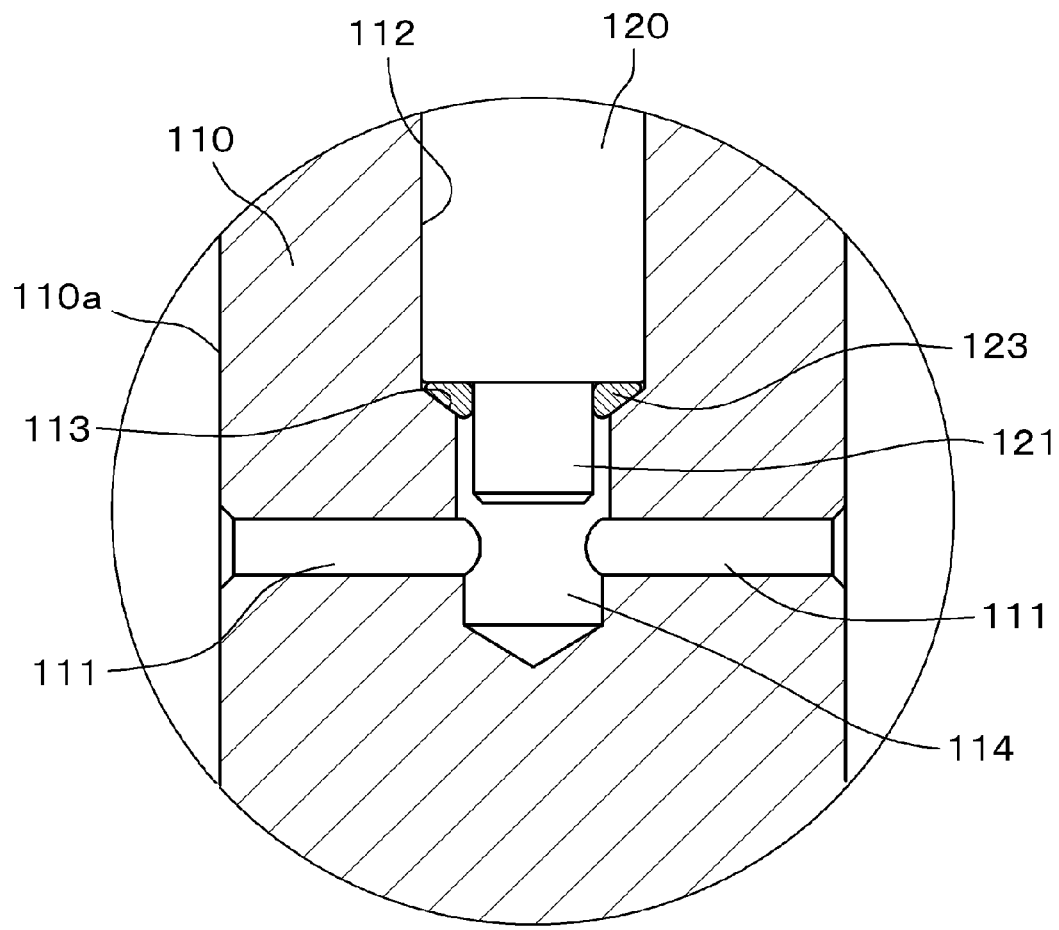
FIG. 6 is an enlarged view of portion C of FIG. 3.
Figure 7:
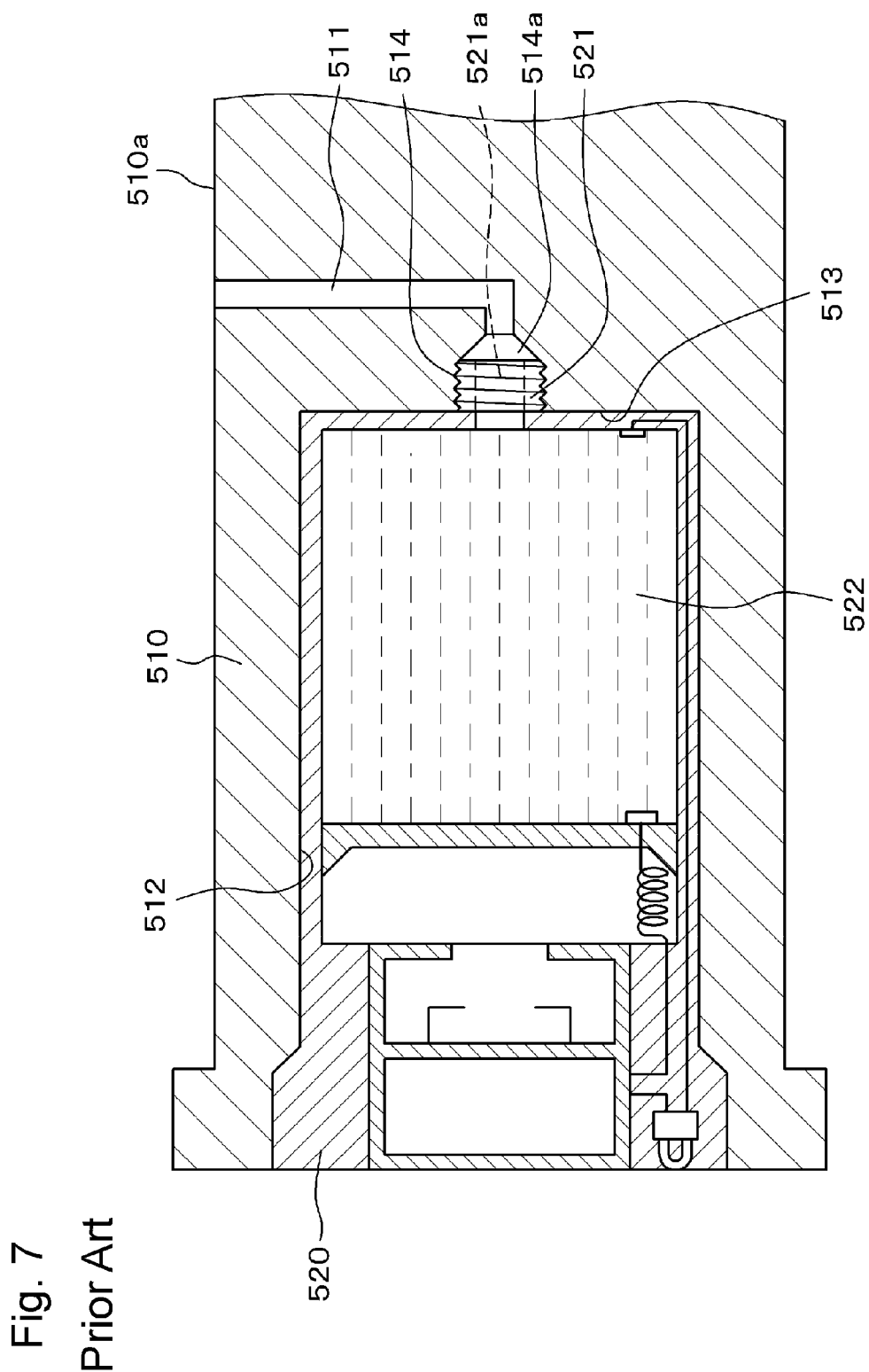
FIG. 7 is a cross-sectional view of a connecting pin in a self-lubricating chain currently known in the art.

As shown in FIGS. 1 and 3 in the central portion of the connecting pin 110 in the longitudinal direction is formed a lubricating hole 111, which opens from the inside of the connecting pin 110 to an outer circumferential surface 110a. A hollow portion 112 having a bottom portion 113 is formed so as to extend from one end of the connecting pin 110 to the center of the connecting pin 110 in the longitudinal direction. The hollow portion 112 is attachably and detachably attached a lubricating oil supply device 120. Lubricating oil is supplied to the outer circumferential surface 110a of the connecting pin through the lubricating hole 111. Further, the connecting pin 110 and the bush 106 connected to as to enable the smooth rotation therebetween.

As shown FIGS. 3-6, the hollow portion 112 of the connecting pin 110 has a concave fitting portion 114 communicating with the lubricating hole 111 at the bottom portion 113. A lid receiving concave portion 115, which has a large diameter, is provided on one side the connecting pin 110, and is connected to the hollow portion 112.

The lubricating oil supply device 120 has a protruding portion 121 having a lubricating oil outflow port. The lubricating oil supply device 120 is inserted to a concave fitting portion 114 provided at the bottom portion 113 of the hollow portion 112 of the connecting pin 110. The lubricating oil supply device 120 is brought into close fit-contact with the bottom 113 by placing a bottom portion O-ring 123 between the lubricating oil supply device 120 and the connecting pin 110.

A female thread portion is provided on an inner circumference of the lid receiving portion 115. A lid member 130 having a male thread portion is screwed into female thread portion on the outer circumference of the lubricating oil supply device 120. The lubricating oil supply device 120 is closely press-sealed into the hollow portion 112 of the connecting pin 110 through an O-ring 124 at the opening and pressing O-ring 125.

The lid member 130 is provided with an engagement hole 131, which engages with a tool at the time of screwing. When the lubricating oil supply device 120 is screwed to a position where it is closely press-sealed into the hollow portion 112 of the connecting pin 110, the lid member 130 is formed such that it is received in the lid receiving concave portion 115 of the connecting pin 110.

Using the above-mentioned configuration, lubricating oil supplied from the lubricating oil supply device 120 is supplied to the outer circumferential surface 110a of the connecting pin through the lubricating hole 111 without leaking out to the hollow portion 112 because of the O-ring 123 which is positioned when the lubricating oil supply device 120 is secured to the connecting pin 110. By using the O-ring 123 at the bottom portion, the O-ring 124 at the opening portion and the pressing O-ring 125 between the lubricating oil supply device 120 and the connecting pin 110, it is possible to securely position the lubricating oil supply device 120 without allowing leaks and without transmitting vibration to the lubricating oil supply device 120. Thus it is possible to reduce leaks, noise, unwanted debris, and vibration without loosening the fitting between the protruding portion 121 and the concave fitting portion 114. As the result the durability and life of the chain can be extended.

Further, the lid member 130 can be used to press the lubricating oil supply device 120 into the hollow portion 112 of the connecting pin 110, the attaching and detaching of the lubricating oil supply device 120 can be easily reliably performed, and at the same time since an end surface of the lubricating oil supply device 120 is not exposed at an end surface of the connecting pin 110, it is possible to prevent damage to the lubricating oil supply device 120 due to a direct clash with articles being conveyed by the chain.

While the lubricating oil supplied to an outer circumferential surface 110a of the connecting pin 110 acts together with a lubricant in order to reduce rotational sliding friction between the connecting pin 110 and the bush 106, a useless outflow of the lubricating oil to the outside is prevented by a seal structure provided on both end portions in the axial direction of the bush 106.

As shown in FIG. 3, the seal structure is composed of a distance member 140 disposed between the outer link plate 101 and the inner link plate 102 and an oil seal 150 provided between the inner link plate 102 and the distance member 140. The distance member 140 has a flat shape on an outer link plate 101 side and is fitted to an outer circumference of the connecting pin 110 integrally with the outer link plate 101 with a step portion 141 is provided on an inner link plate 102 side. The outer circumferential side than the step portion 141 faces the inner link plate 102 with very small space being formed between the step portion 141 and the inner link plate 102.

Both ends of the bush 106 are fitted into bush holes 104 of the inner link plate 102 so that they protrude to extend within the area of the step portion 141 of the distance member 140 and an oil seal 150 is provided in a space between an inner circumference of the step portion 141 of the distance member 140 and the inner link plate so that two lips 151 of the oil seal 150 come into sliding contact with the distance member 140.

Since the distance member 140 is machined the surface of the distance member 140 has a smooth surface which optimal for providing a sealing function.

Using the above-mentioned configuration, the lubricating oil supplied from the lubricating oil supply device 120, which lubricates rotational sliding of the connecting pin 110 and the bush 106, is sealed by bringing the lip of the oil seal 150 into sliding contact with the distance member 140 which has a smooth surface using a pressing force. Thus, the amount of outflow is controlled by the discharge of the self-lubricating device and the entry of foreign matter from the outside can be prevented.

Further, the space between two lips 151 of the oil seal 150 functions as a lubricating oil reservoir, and the life of the oil seal is increased. Because the discharge route for lubricating oil includes a very small space between the distance member 140 and the inner link plate 102, the very small space between the distance member 140 and the oil seal 150 and the very small space between the distance member 140 and the inner link plate 102, the discharge route has a labyrinth structure, making it more difficult for foreign matter to enter from the outside, while ensuring that the lubricating oil is stably supplied to an outer circumferential surface of the connecting pin.

Since the distance member 140 is composed of an independent member other than an outer link plate 101 and an inner link plate 102 which are selected for a required tensile strength, a material specialized for sliding or seal performance can be selected as a material of the distance member 140. Furthermore, there is no need to modify the shape of the outer link plate 101 and inner link plate 102, meaning that it is possible to easily manufacture the self-lubricating oil supply device.

As described above, according to the present invention, the attaching and detaching of the lubricating oil supply device is a simple and reliable process which can be performed so as to reduce the vibration, noise, and debris that exist in the chains currently known in the art. Further, lubricating oil is reliably supplied to an outer circumferential surface of the connecting pin so that the life of the chain can be extended. Thus the effects of the present invention are very large.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Although embodiments of the invention may comprise any type of the chains such as a roller chain, a bush chain, a bushless chain and the like. Thus, the present invention may be utilized in any chain in which lubrication is needed on a circumferential surface of a connecting pin.

Further, although the self-lubricating chain of the present invention may be used in any variety of situations, the embodiments described herein are particularly useful in a largely loaded chain such as a bucket chain for loading iron core, coal and the like, a large load chain for conveying heavy articles such as automobiles and the like, a flow conveyer chain and the like for granules or the like.

What is claimed is:

1. A self-lubricating chain comprising:
    an outer link including at least two outer link plates including front and rear connecting pin holes;
    an inner link including at least two inner link plates each having a pair of front and rear bush holes to which bushes are fitted and fixed;
    connecting pins connecting the inner and outer links to each other while being fitted and fixed to the connecting pin holes and idly fitted into the bush holes, each of the connecting pins having:
        a hollow portion that extends within the connecting pin from one side end of the connecting pin in a longitudinal direction of the connecting pin and has a bottom around a center of the connecting pin in the longitudinal direction; and
        a concave fitting portion formed within the connecting pin;
    a lubricant oil supply device configured to be removably attached to the hollow portion and having a protruding portion that is provided with a lubricant oil outflow port for flowing out lubricant oil to an oil supplying hole opening from an inside of the connecting pin to an outer circumferential surface of the connecting pin;
    a lid member attached to a first end of the lubricant oil supply device, and the lid member presses and seals the lubricant oil supply device into the hollow portion; and
    a bottom O-ring disposed between the lubricant oil supply device and the concave fitting portion to tightly seal the lubricant oil supply device with the bottom of the hollow portion,
    wherein:
        the hollow portion terminates at the concave fitting portion communicating with the oil supplying hole;

the protruding portion composes a second end of the lubricant oil supply device; and the second end is accommodated and tightly fitted into the concave fitting portion.

2. The self-lubricating chain according to claim 1, further comprising:
a lid receiving concave portion formed at the one side end of the connecting pin so as to have a diameter which is larger than that of the hollow portion, to removably accommodate the lid member and is in communication with the hollow portion;
a male thread portion that is provided around the lid member and can be screwed into a female thread portion that extends in a circumferential direction of the lid receiving concave portion; and
an O-ring disposed around an opening of the hollow portion to press and seal the lubricant oil supply device into the hollow portion.

3. The self-lubricating chain according to claim 1, further comprising:
a distance member interposed between the outer link plate and the inner link plate and provided around the connecting pin; and
an oil seal disposed between the inner link plate and the distance member.

4. The self-lubricating chain according to claim 3, wherein the oil seal has at least two lips formed on the distance member side, wherein a space formed between the at least two lips functions as a lubricating oil reservoir.

5. The self-lubricating chain according to claim 3, wherein the distance member is disposed so as to oppose the inner link plate with a small space formed between the distance member and the inner link plate, and wherein a surface of the distance member has a shape which includes a series of steps, one of which comes into contact with the oil seal.

6. A self-lubricating chain comprising:
an outer link including at least two outer link plates including front and rear connecting pin holes;
an inner link including at least two inner link plates-each having a pair of front and rear bush holes to which bushes are fitted and fixed;
connecting pins connecting the inner and outer links to each other while being fitted and fixed to the connecting pin holes and idly fitted into the bush holes, each of the connecting pins having:
a hollow portion that extends within the connecting pin from one side end of the connecting pin in a longitudinal direction of the connecting pin and the hollow portion has a bottom around a center of the connecting pin in the longitudinal direction;
a lid receiving concave portion formed at the one side end of the connecting pin so as to have a diameter which is larger than that of the hollow portion, the lid receiving concave portion having a female thread portion formed around an inner circumferential surface of the lid receiving concave portion; and
a concave fitting portion formed at a second side end of the connecting pin;
a lubricant oil supply device configured to be removably attached to the hollow portion and having a protruding portion that is provided with a lubricant oil outflow port for flowing out lubricant oil to an oil supplying hole opening from an inside of the connecting pin to an outer circumferential surface of the connecting pin;
a lid member attached to a first end of the lubricant oil supply device, and the lid member presses and seals the lubricant oil supply device into the hollow portion, the lid member having a male thread portion that may be screwed into the female thread portion of the lid receiving concave fitting portion; and
a bottom O-ring disposed between the lubricant oil supply device and the concave fitting portion to tightly seal the lubricant oil supply device with the bottom of the hollow portion, wherein,
the hollow portion terminates at the concave fitting portion that communicates with the oil supplying hole; and
a lubricant oil supply passage for supplying the lubricant oil from the lubricant oil flow-out port to the outside of the connecting pin via the oil supplying hole is defined by screwing the male thread portion to the female thread portion so as to press fit the lubricant oil supply device to the hollow portion while inserting the lubricant oil supply device from the one side end to the hollow portion and by slidably accommodating the lubricant oil supply device into the hollow portion.

7. The self-lubricating chain according to claim 6, wherein the female thread portion is formed in the same end as the hollow portion and has a larger diameter than the hollow portion, and the self-lubricating chain further comprising an O-ring disposed around an opening of the hollow portion so as to press and seal the lubricant oil supply device into the hollow portion when the lid member is screwed into the female thread portion of the connecting pin.

8. The self-lubricating chain according to claim 6, further comprising:
a distance member disposed between the outer link plate and the inner link plate and provided around the connecting pin; and
an oil seal disposed between the inner link plate and the distance member.

9. The self-lubricating chain according to claim 8, wherein the oil seal has at least two lips formed on the distance member side, wherein a space formed between the at least two lips functions as a lubricating oil reservoir.

10. The self-lubricating chain according to claim 8, wherein the distance member is disposed so as to oppose the inner link plate with a small space formed between the distance member and the inner link plate, and wherein a surface of the distance member has a shape which includes a series of steps, one of which comes into contact with the oil seal.

11. The self-lubricating chain according to claim 1, wherein the lubricant oil supply device is configured to be completely received within the connecting pin.

12. The self-lubricating chain according to claim 1, wherein the lubricant oil supply device is configured to be slidingly received in the connecting pin.

13. The self-lubricating chain according to claim 1, further comprising one or more seals disposed proximate the lubricant oil supply device so as to substantially prevent leakage of oil from the lubricant oil supply device to the hollow portion.

14. A self-lubricating chain comprising:
an outer link including at least two outer link plates including front and rear connecting pin holes;
an inner link including at least two inner link plates each having a pair of front and rear bush holes to which bushes are fitted and fixed;
connecting pins connecting the inner and outer links to each other while being fitted and fixed to the connecting pin holes and idly fitted into the bush holes, each of the connecting pins having;
a hollow portion that extends within the connecting pin from one side end of the connecting pin in a longitudinal direction of the connecting pin and the hollow portion has a bottom around a center of the connecting pin in the longitudinal direction;

a lid receiving concave portion formed at the one side end of the connecting pin; and a concave fitting portion formed at a second side end of the connecting pin so as to define an end of the hollow portion and to be in communication with an oil supplying hole opening from an inside of the connecting pin to an outer circumferential surface of the connecting pin;

a lubricant oil supply device having a protruding portion that extends within the connecting pin from one side end of the connecting pin in a longitudinal direction of the connecting pin within the connecting pin and removably attached to a hollow portion having a bottom at a center of the connecting pin in the longitudinal direction and that has a lubricating oil outflow port for flowing out lubricant oil from an inside of the connecting pin to an oil supply port opening on an outer circumferential surface of the connecting pin; and a lid member attached to one end of lubricant oil supply device, and the lid member presses and seals the lubricant oil supply device within the hollow portion;

a bottom O-ring disposed between the lubricant oil supply device and the concave fitting portion to tightly seal the lubricant oil supply device with the bottom of the hollow portion;

a first seal formed within the connecting pin so as to be interposed between the concave fitting portion and a second end of the lubricant oil supply device;

a second seal interposed between the lid member and the end of the lubricant oil supply device; and a third seal that contacts the lid member, the lid receiving concave portion and an outer circumferential surface of the first end of the lubricant oil supply device, wherein the second seal, the third seal and the lid member are configured so that pressure is applied to the lubricant oil supply device when the lid member engages completely with the connecting pin, and the first seal is configured so as to seal the lubricant oil supply device with the bottom of the hollow portion.

15. The self-lubricating chain according to claim 14, wherein the lid receiving concave portion is configured so that an end surface of the lid member is flush with an end surface of the one side end of the connecting pin when the lid member is fully received in the lid receiving concave portion.

16. The self-lubricating chain according to claim 14, further comprising:

a distance member disposed between the outer link plate and the inner link plate and provided around the connecting pin; and an oil seal disposed between the inner link plate and the distance member.

17. The self-lubricating chain according to claim 14, wherein the lubricant oil supply device is configured to be completely received within the connecting pin.

18. The self-lubricating chain according to claim 14, further comprising a roller disposed between the inner link plates and idly fitted around the bushing.

* * * * *